No. 893,216. PATENTED JULY 14, 1908.
D. B. WOOD.
BALE TYING ATTACHMENT TO HAY PRESSES.
APPLICATION FILED NOV. 10, 1906.
4 SHEETS—SHEET 1.
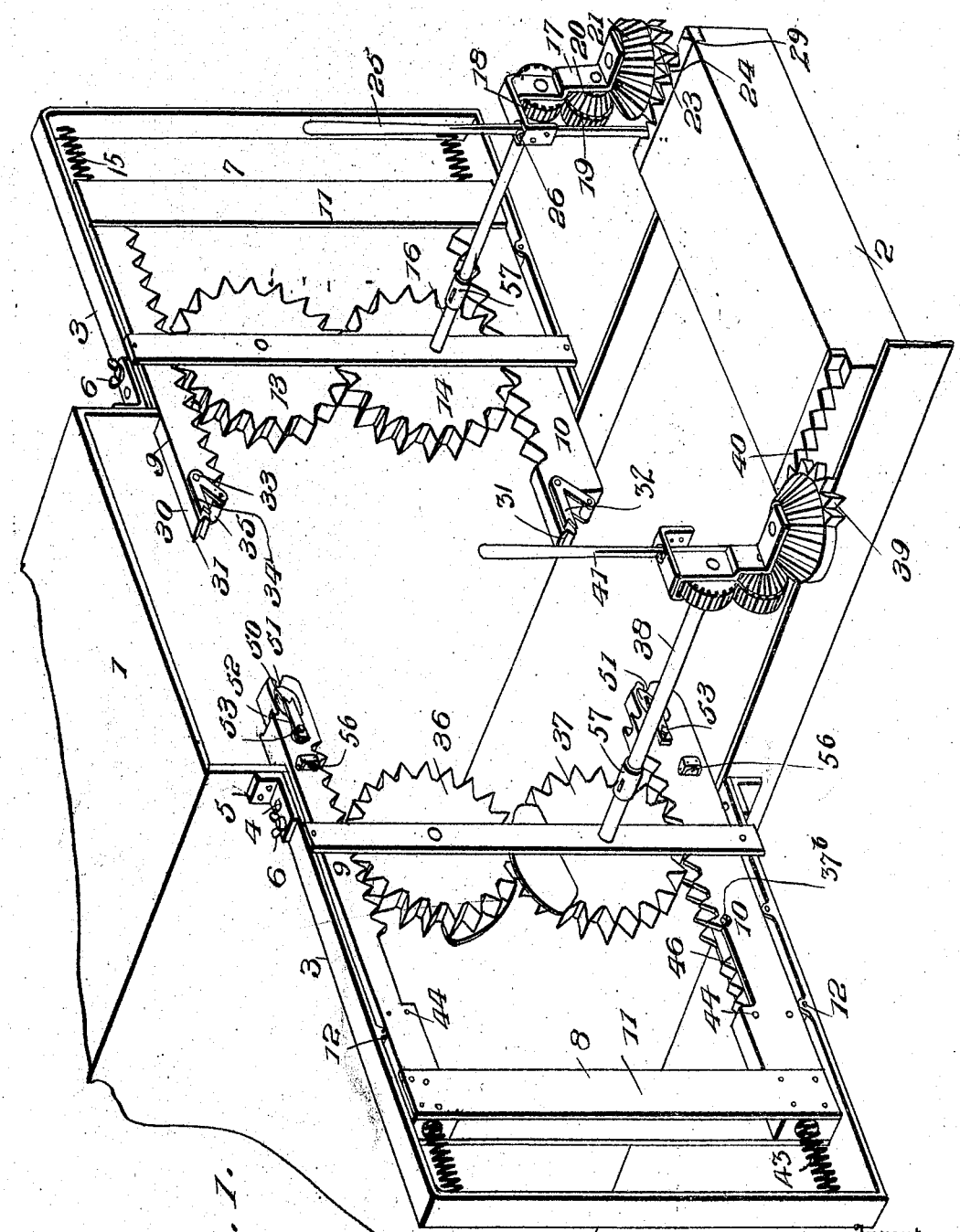

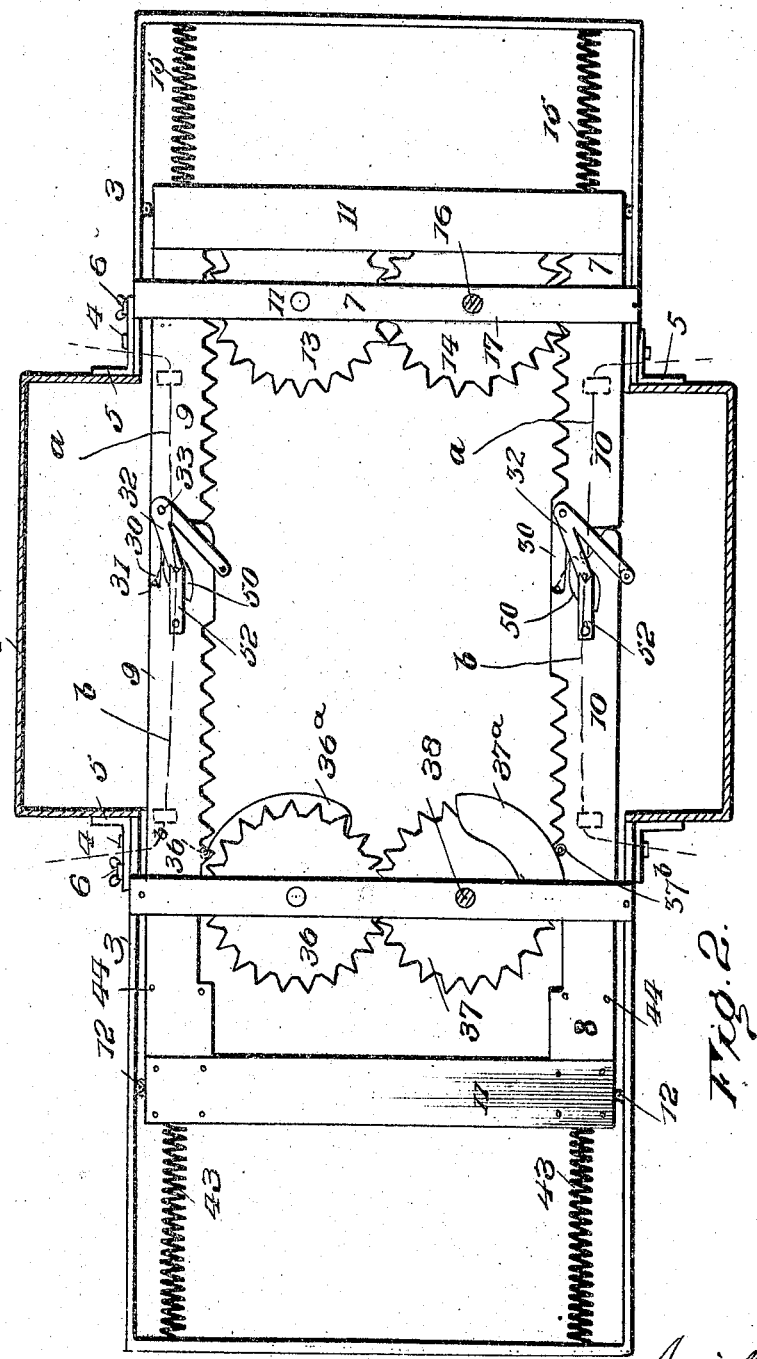

No. 893,216. PATENTED JULY 14, 1908.
D. B. WOOD.
BALE TYING ATTACHMENT TO HAY PRESSES.
APPLICATION FILED NOV. 10, 1906.
4 SHEETS—SHEET 3.
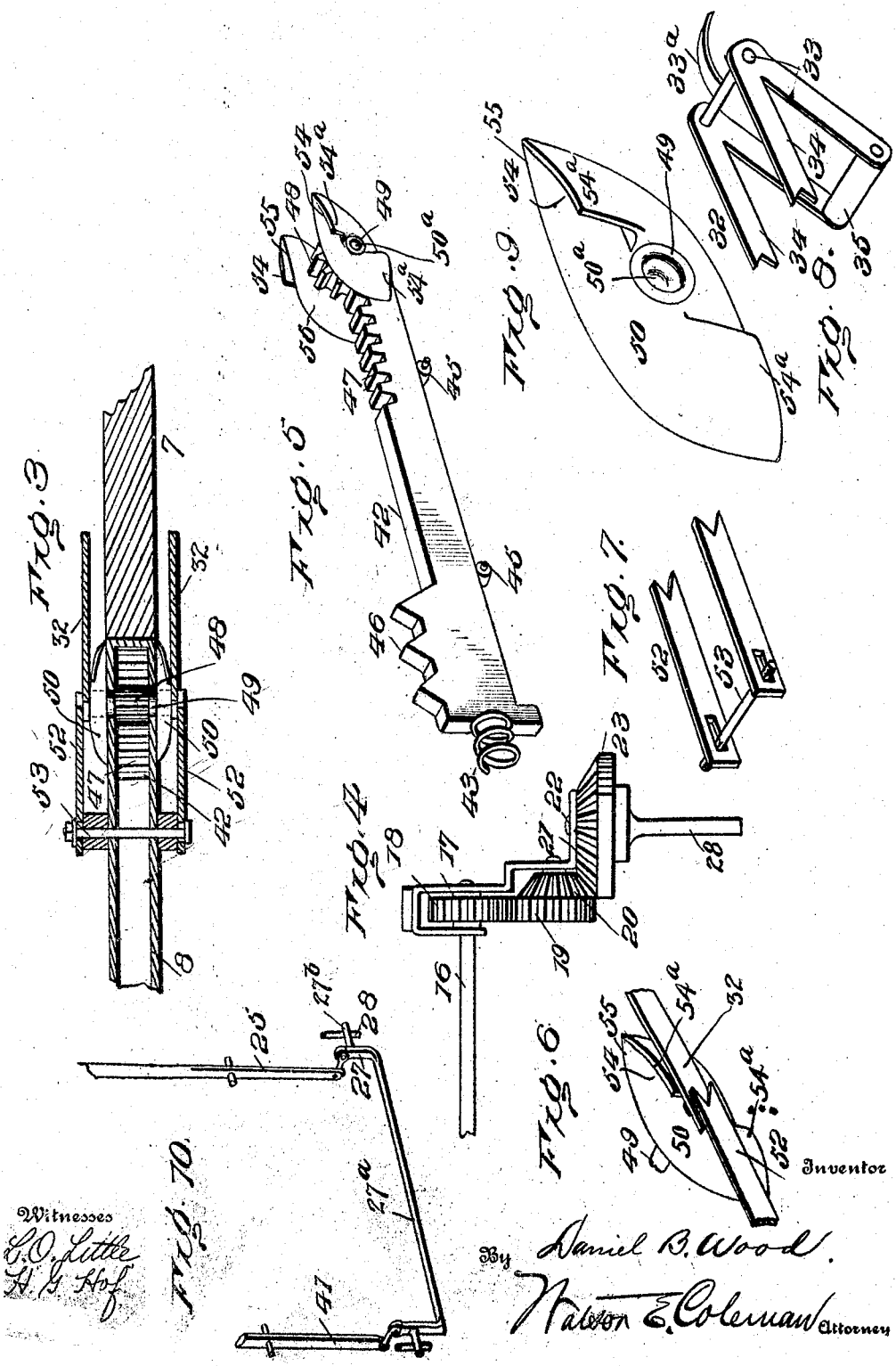
Witnesses
L. O. Little
H. G. Hof
Inventor
Daniel B. Wood.
By Watson E. Coleman, Attorney

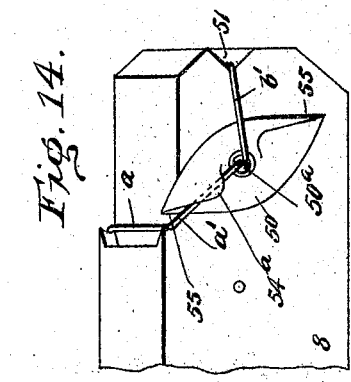
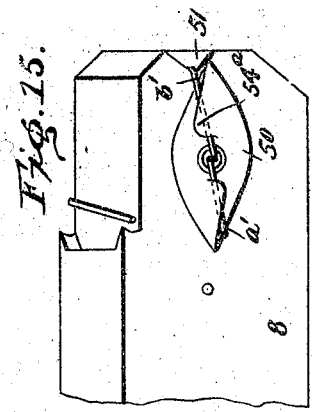
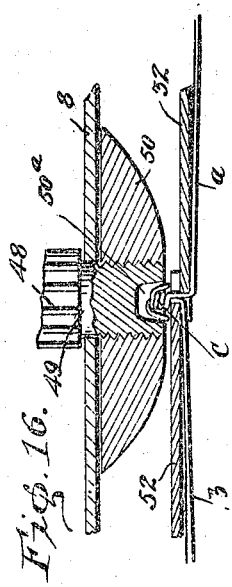
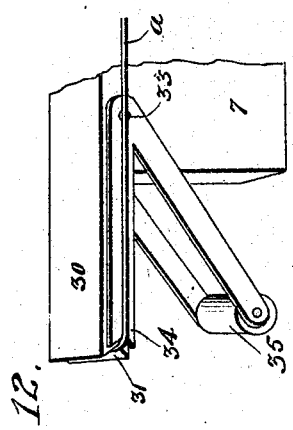
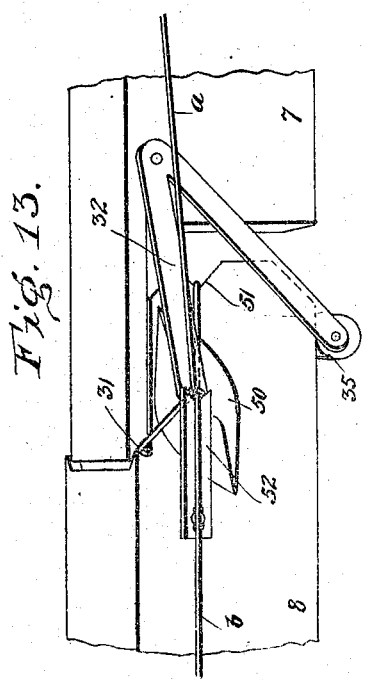
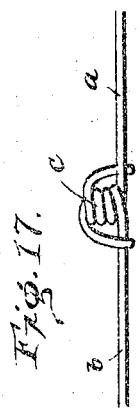

UNITED STATES PATENT OFFICE.

DANIEL BENTON WOOD, OF ALMYRA, ARKANSAS.

BALE-TYING ATTACHMENT TO HAY-PRESSES.

No. 893,216.

Specification of Letters Patent.

Patented July 14, 1908.

Application filed November 10, 1906. Serial No. 342,925.

*To all whom it may concern:*

Be it known that I, DANIEL BENTON WOOD, a citizen of the United States, residing at Almyra, in the county of Arkansas and State of Arkansas, have invented certain new and useful Improvements in Bale-Tying Attachments for Presses; and I do declare the following to be a full, clear, and exact description of the invention, such as will enable others skilled in the art to which it appertains to make and use the same.

My invention relates to improvements in machines for tying the wires upon bales formed in hay presses and the like.

The principal objects of my invention are to provide a simple, practical and efficient mechanism for wiring bales, to discard the use of head blocks and to use wire direct from a roll or spool.

Another object of the invention is to provide a device or mechanism of this character which will be in the form of an attachment applicable to presses of various kinds now on the market, and one which when not in use may be folded against the press so as not to interfere with the transportation of the same.

A further object of the invention is to provide a device or mechanism of this character which will be operative by power derived from the plunger of the press.

With the above and other objects in view, which will appear as the nature of the invention is better understood, the same consists of the novel features of construction and the combination and arrangement of parts hereinafter described and claimed, and illustrated in the accompanying drawings, in which Figure 1 is a sectional perspective of a baling press, with my improved tying attachment or mechanism applied thereto, the wiring jaws of the attachment being shown in a partially projecting position; Fig. 2 is a vertical transverse section, showing the wiring jaws in an operative position for holding and twisting the wires; Fig. 3 is a detail horizontal section through the wiring jaws and the wire holders; Fig. 4 is a detail view of the gearing; Fig. 5 is a perspective view of one of the rack bars and the parts which co-act with it; Fig. 6 is a detail view of the wire holders and the twisting head, illustrating the operation of the same; Figs. 7 and 8 are perspective views of the wire holders; Fig. 9 is a perspective view of one of the twisting heads; Fig. 10 is a detail perspective of the rock shaft and its operating levers; Fig. 11 is a detail perspective showing a detachable coupling for one of the longitudinal shafts; Figs. 12 to 16 inclusive, are views illustrating the manner in which the wires are twisted or tied; and Fig. 17 is a detail view of one of the knots or ties formed by the machine.

In the drawings, the numeral 1 denotes the bale chamber and 2 the reciprocating plunger of a press for baling hay or other material. These parts may be constructed and operated in any suitable manner since they form no part of the present invention, and it will be understood that the plunger 2 may be mounted for reciprocation in any plane other than the horizontal one illustrated.

The numeral 3 denotes two rectangular frames which support the operative parts of the invention and which project outwardly from opposite sides of the chamber 1 and are in transverse alinement. The frames 3 have their inner ends mounted upon vertical pivots 4 upon angle brackets 5 suitably secured to the sides of the press, and said frames are retained in their extended position shown in the drawings by set screws 6 or any other suitable means. This manner of mounting the frames 3 permits them to be swung against the side of the press when the tying attachment is not needed so that the press may be conveniently transported.

In the supporting frames 3 are mounted wire carriers or jaws 7, 8 which are adapted to be projected into the chamber 1 from opposite sides and in rear of the bale to be wired. Each of said carriers comprises upper and lower arms or members 9, 10 united at their outer ends by vertical portions or members 11, as clearly shown in Fig. 1. The said carriers slide in the frames 3 and upon anti-friction rollers 12 arranged in the top and bottom of said frames, as shown.

The wire carrier 7 is actuated by two gears 13, 14, which are suitably journaled in the frame 3 and in mesh with each other and with rack teeth arranged upon the opposing edges of the arms 9, 10. Springs 15 are arranged between the outer ends of the carrier 7 and its frame 3 for the purpose of retracting the former. The gear 14 is removably mounted upon one end of a longitudinal shaft 16 which has its other end journaled in a supporting bracket 17 arranged upon one side of the press. Upon the latter end of said shaft is a gear 18 which meshes with a gear 19 formed integral with or secured to a beveled gear 20 which latter meshes with a similar gear 21 fixed upon a vertical pivot 22. Formed integral with the beveled gear 21 is a segmental gear 23 adapted to mesh with a rack 24 arranged upon one side of the plunger 2. The segmental gear 23 is so constructed that its teeth are normally out of the path of the rack 24 as the plunger is reciprocated in compressing the hay or other material in the chamber 1, but when it is desired to operate the tying attachment the gear 23 is moved into an operative position by actuating the lever 25. The latter is suitably fulcrumed at 26 and is connected by a link to one end of a crank arm 27 which is located on one end of a rock shaft 27ª and carries a pin 27ᵇ adapted to engage a pin 28 depending from the under face of said gear. When the gear 23 is thus thrown into mesh with the rack 24 it will be actuated as the plunger passes it and when thus actuated it will, through the intermediate gearing, project the carrier 7 into the bale chamber. The carrier is held projected by the engagement of the smooth edge 29 of the plunger in rear of the rack 24, with the last tooth of the segmental gear 23, as will be readily understood. The inner end of each of the arms 9, 10 is formed with a forwardly projecting portion 30 having a wire receiving notch 31 adapted to form the jaw proper of the carrier. Upon each of said arms 9 is also mounted a wire holder 32, the construction of which is more clearly shown in Fig. 8. This holder consists of two V-shaped side members arranged upon the opposite sides of one of the arms of said carrier and connected to a pivot 33. To said pivot is attached a spring 33ª for retaining the holder in its normal position. The upper arm 34 of each side has a notched outer end to register with the notch 31 in the projection 30 on said arm and the lower arms or members of each of said V-shaped sides are connected by an anti-friction roller 35 adapted to be engaged and actuated by the inner end of the corresponding arm on the opposing carrier 8.

The carrier 8 is actuated by two gears 36, 37 which are similar to the gears 13, 14 and which mesh with each other and with racks upon the upper and lower arms 9, 10 of the carrier 8. The gear 37 is mounted upon a shaft 38 which is similar to the shaft 16 and which is operatively connected to a segmental gear 39 in the same manner in which the shaft 16 is connected to the segmental gear 23. The segmental gear 39 meshes with a rack 40 upon the opposite side of the plunger 2 and it is controlled by a hand lever 41 similar to the lever 25. This lever 41 has its lower end connected by a link to a crank arm on the rock shaft 27, which latter extends transversely of the press in its lower portion and beneath the plunger. The carrier 8 is held projected by the engagement of segmental flanges or projections 36ª, 37ª arranged upon the gears 36, 37 and adapted to engage stops 36ᵇ, 37ᵇ in the form of rollers journaled upon the arms 9, 10 of said carrier adjacent to the outer end of their racks. The upper and lower members of the carrier 8 are hollow to receive longitudinally reciprocating bars 42 which are moved in one direction by coil springs 43 arranged in the outer ends of the carrier 8 and connected at their ends to the bars 42 and to the outer end of the frame 3. The outward movement of the bars 42 under the action of said springs is limited by one or more stop pins 44 and said bars are adapted to slide upon anti-friction rollers 45, as shown. At the outer end of each of the bars 42 is provided a rack 46 which is adapted to mesh with one of the gears 36, 37 after said gears have projected the carrier 8 to the limit of its inward sliding movement. Upon the inner end of each of the bars 42 is a rack 47 adapted to mesh with a pinion 48 fixed upon a transverse shaft 49 journaled in the inner end of one of the arms of the carrier 8. The pinions 48 are arranged transversely in said recessed inner ends of the arms of the carrier and upon the outer ends of their shafts 49 on opposite sides of said arms are suitably fixed combined twisting and cutting heads 50. The latter are arranged slightly in rear of wire receiving notches or jaws 51 formed upon said ends of the arms and arranged upon the outer sides of said twisters and cutters 50 are wire holders 52 adapted to co-act with the wire holder 32 upon the arms of the opposing carrier 7. The wire holders 52 are in the form of bars having notched inner ends to receive the wires and slotted outer or rear ends to receive a transverse clamping bolt 53 by means of which they may be adjusted longitudinally on the arms of the carrier. Each of the twisters 50, as more clearly shown in Fig. 9, consists of an elongated body having a flat inner side and a substantially convex outer side. Each of the tapered ends of said body has a straight cutting edge 55 adjacent to its flat inner side which is adapted to work against the outer face of one of the wire carrying arms and to sever the wire, as presently explained. Adjacent to the cutting edge 55 at each end of the twister body is formed a recess 54 which provides a lip or projection 54ª. The ends of the wire cut by the sharpened edges 55 are adapted to enter the recess 54 and to be engaged by the projection or lip 54ª and bent as the twister is rotated. Each of these combined cutters and twisters is suitably secured upon one of the ends of the shaft 49 and in which the center of its outer face or in the end of the shaft is formed a concentric circular recess or depression 50ᵃ into which the twisted wires sink, as hereinafter explained.

The wire with which the bales are to be tied is fed from four rolls or spools (not illustrated) suitably arranged upon the press, two being upon each side of the same. These wires which are designated by the letters $a$ and $b$ are passed through suitable openings in the sides of the press chamber 1 and over guides or guide rollers 56 arranged in or adjacent to said openings.

In order to permit the two frames 3 to be folded against the sides of the press, the shafts 16 and 38 are each made in two sections and are adapted to be detachably connected by a coupling 57 such as the one illustrated in Fig. 11. This connection for the shaft sections consists in providing one section with a tongue and the other with a groove to receive the tongue and a coupling sleeve to slide upon one of the shaft sections and to fit over said interlocked or engaged ends of the sections as will be readily understood.

The operation of the attachment is as follows: When the parts are in their normal inoperative positions ready for operation, the wire carriers 7, 8 are retracted so that they are entirely without the bale chamber 1. Before the bale is formed, the ends of the four wires are drawn to the center of the chamber and twisted together by hand, that is, the two upper wires are twisted together and the two lower ones are twisted together. These two sets of wires form two ties for the bale. As the bale is formed by the plunger forcing the material into the chamber 1, the united wires will be moved rearwardly into said chamber; and when the bale is of the desired size, one of the hand levers 25 or 41 is actuated after the plunger has made its final stroke and has been retracted or partially retracted. The operation of one of the levers actuates the rock shaft 27ᵃ so that the segmental gears 23, 39 are thrown into the path of the racks 24, 40 on the plunger 2 which latter as it moves inwardly will impart its motion through the intermediate gearing to the wire carriers 7, 8. As these carriers are forced inwardly toward each other, the wires $a$, $b$ arranged in their jaws 31, 51 will be drawn inwardly around the rear end of the bale. The arrangement of the wires in said jaws is clearly shown in Fig. 12 of the drawings, in which it will be noted that the wire $b$ extends over the holder 52 and through its notched ends, then over the front end of the twister 50 and then through the jaw 51, and the wire $a$ through the notched ends of the holder 32 and the jaw 31. As the beveled lower portions of the inner ends of the arms on the carrier 8 engage the rollers 35 on the holders 32 the notched arms 34 of the latter will be swung downwardly so that the wire $a$ will be brought down and into the notched ends of the holder 52, as clearly shown in Fig. 13. When both of the wires are thus clamped between the notched ends of the holders 32, 52 on each side of each pair of the carrier arms, said carriers will have reached the limit of their inward movement and the gears 36, 37 then leave the racks upon the arms of the carrier 8 and mesh with the racks 46 on the sliding bars 42 within said carrier arms. As these rack bars 42 are forced inwardly, the racks 47 rotate the pinions 48 and hence the twisting and cutting heads 50 on their shafts 49. As the combined twisters and cutters 50 are thus rotated their cutting edges 55 will successively sever the wires $a$ and $b$, as will be readily seen upon reference to Figs. 14 and 15. Said wires are severed close to the opposite side faces of the carrier arms so there will be small waste pieces corresponding in length to the width of said arms and so that there will be projecting end portions $a'$, and $b'$ which will be caught in the recess 54 of the head by its projecting lips 54ᵃ and as said head is rotated will be twisted or coiled together in a manner clearly shown in Figs. 16 and 17. This coiling or twisting is done upon the inner faces of the holders 32, 52 and the twist or tie $c$ will be caused to enter recess or depression 50ᵃ in the head 50 as said ends $a'$, $b'$ are drawn through the recess 54. As the twisted or coiled portion $c$ enters said recess or depression 50ᵃ, the extremities of the wires are bent, as clearly shown in Fig. 7, so that the wires cannot pull apart. It will be understood that the wires that are twisted together upon the front or inner side of the carriers complete the ties on the finished bale and those twisted upon the outer or rear side of the same unite the wires which form the ties for the next bale. After the wires have been thus severed and twisted, the rearward movement of the plunger together with the springs 15, 43 will return the parts of the attachment to their normal positions so that the next bale may be formed.

Having thus described my invention what I claim and desire to secure by Letters Patent is:—

1. The combination with a baling press, of a wire carrier to enter the same, the combined rotary cutter and twister 50 having cutting edges at its opposite ends and wire engaging lips arranged upon one face adjacent to said ends, and means for operating said cutter and twister.

2. The combination with a baling press, of wire carriers to enter the same from its opposite sides, a combined rotary cutter and twister upon one of said carriers, and a rack slidably mounted upon the same carrier for operating said combined cutter and twister.

3. The combination with a baling press, of wire carriers to enter the same from its opposite sides, a transverse shaft in one of said carriers, a pinion upon the central portion of said shaft, a rack for actuating said pinion, the combined cutters and twisters 50 arranged upon the opposite ends of said shaft and having flat inner sides to work against the opposite faces of said carrier, said cutters and twisters also having cutting edges and wire engaging lips, and wire holders carried by said carriers and adapted to hold the wires upon the outer sides of the said cutters and twisters.

4. The combination with a baling press, of wire carrying arms to enter the same from opposite sides, a twisting element upon one of said arms and means upon the same arm for operating said element.

5. The combination with a baling press, of wire carrying arms to enter the same from opposite sides, a rigid wire holder upon one of said arms, a combined cutting and twisting element upon the same arm, the latter arm also having an inclined surface, and the angular wire holder 32 pivoted upon the other arm and having one member to engage and actuate the wire and another member to be engaged and actuated by the inclined surface on said wire carrying arm, substantially as set forth.

6. The combination with a baling press, of wire carrying arms to enter the same from opposite sides, rotary twisters arranged upon the opposite sides of one of said arms and means upon the same arm for operating said twisters.

7. The combination with a baling press, of a pair of wire carrying arms to enter the same from opposite sides, a twister carried by one of said arms, a wire holder upon the same arm and a swinging wire holder upon the other arm actuated to an operative position by the arm carrying said twister.

8. The combination with a baling press, of a pair of wire carrying arms to enter the same from opposite side, a twister carried by one of said arms, an element for operating said twister and means to successively engage and actuate the arm carrying said twister and said element.

9. The combination with a baling press, of a pair of wire carrying arms to enter the same from opposite sides, a twister carried by one of said arms, a bar slidable upon the arm carrying the twister for rotating the latter, rack teeth upon said arm and said bar, and an actuating gear to successively engage the rack teeth upon said arm and bar.

10. The combination with a baling press, of wire carrying arms to enter the same from opposite sides, co-acting wire holders upon said arms, the holder upon one arm being stationary and the one upon the other arm being movable and actuated to an operative position by the opposing arm, a combined rotary cutter and twister upon the arm having said stationary wire holder, a rack bar upon the last mentioned arm for operating said cutter and twister and gearing for actuating said arms, the gearing for one arm being adapted to also actuate said rack bar, substantially as described.

11. The combination with a baling press having a chamber and a reciprocating plunger, of wire carrying arms to enter the chamber from opposite sides, a twister upon one of said arms, means upon the same arm for operating said twister and means actuated by said plunger for successively actuating said arms and said means for operating the twister.

12. The combination with a baling press having a chamber and a reciprocating plunger, of wire carrying arms to enter the chamber from opposite sides, a combined rotary cutting and twisting element upon one of said arms, a rack bar upon the same arm for actuating said element, rack teeth upon said arms, gearing to engage said rack teeth and said rack bar, segmental gears operatively connected to said gearing and racks upon said plunger for actuating said segmental gears.

13. The combination with a baling press having a chamber and a reciprocating plunger, of wire carrying arms to enter the chamber from opposite sides, a combined rotary cutter and twister upon one of said arms, an element for actuating said cutter and twister and means operated by said plunger for successively actuating said arms and said element.

14. The combination with a baling press having a chamber and a reciprocating plunger, of frames projecting from each side of the same, sliding carriers of U-form mounted in said frames and having upper and lower wire carrying arms provided with rack teeth, wire twisting means upon certain of said arms, and meshing gears arranged in said frames and adapted to engage the racks on said arms.

15. The combination with a baling press having a chamber and a reciprocating plunger, of frames projecting from each side of the same, sliding carriers of U-form mounted in said frames and having upper and lower wire carrying arms provided with rack teeth, wire twisting means upon certain of said arms, meshing gears arranged in said frames and adapted to engage the racks on said arms and means actuated by said plunger for operating said gears.

16. The combination with a baling press, of frames upon the opposite sides of the same, means carried by said frames, for tying bale wires and means to permit said frames to be folded against the sides of the press.

17. The combination with a baling press, of brackets upon the opposite sides of the same, frames pivoted upon said brackets and foldable against the sides of the press, means for securing said frames in their extended positions and means upon said frames for tying bale wires.

18. The combination in a baling-press, of a hinged frame extending laterally from one side of the press and foldable thereagainst, a reciprocating wire carrier mounted in said frame, and means for operating said carrier.

DANIEL BENTON WOOD.

Witnesses:
C. M. HILLMAN,
M. G. BENNETT.